United States Patent
Barrick, Jr. et al.

(10) Patent No.: US 6,625,647 B1
(45) Date of Patent: *Sep. 23, 2003

(54) METHOD AND APPARATUS FOR EVALUATING SERVICE TO A USER OVER THE INTERNET

(75) Inventors: James G. Barrick, Jr., Menlo Park, CA (US); Guoqiang Ge, Mountain View, CA (US); Tong Zou, Fremont, CA (US)

(73) Assignee: Keynote Systems, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/414,837

(22) Filed: Oct. 19, 1999

Related U.S. Application Data

(63) Continuation of application No. 08/868,616, filed on Jun. 3, 1997, now Pat. No. 6,006,260.

(51) Int. Cl.⁷ .............................................. G06F 15/16
(52) U.S. Cl. ........................................ 709/224; 709/219
(58) Field of Search ................................ 709/202, 203, 709/217, 218, 219, 223, 224, 227, 230

(56) References Cited

U.S. PATENT DOCUMENTS

| | | | |
|---|---|---|---|
| 5,557,746 A | 9/1996 | Chen et al. | 395/200.06 |
| 5,657,450 A | 8/1997 | Rao et al. | 395/610 |
| 5,696,701 A | 12/1997 | Burgess et al. | 364/551.01 |
| 5,696,965 A | 12/1997 | Dedrick | 395/610 |
| 5,754,772 A | 5/1998 | Leaf | 395/200.33 |
| 5,761,486 A | 6/1998 | Watanabe et al. | 395/500 |
| 5,761,663 A | 6/1998 | Lagarde et al. | 707/10 |
| 5,774,670 A | 6/1998 | Montulli | 395/200.57 |
| 5,790,798 A | 8/1998 | Beckett, II et al. | 395/200.54 |
| 5,790,977 A | 8/1998 | Ezekiel | 702/122 |
| 5,796,633 A | 8/1998 | Burgess et al. | 364/551.01 |
| 5,796,952 A | 8/1998 | Davis et al. | 395/200.54 |
| 5,802,106 A | 9/1998 | Packer | 375/225 |
| 5,805,815 A | 9/1998 | Hill | 395/200.48 |
| 6,006,260 A | * 12/1999 | Barrick, Jr. et al. | 709/224 |

OTHER PUBLICATIONS

Feilding et al.; "Hypertext Transfer Protocol—HTTP/1.1"; RFC 2068, Jan. 1997.*

* cited by examiner

*Primary Examiner*—Marc D. Thompson
(74) *Attorney, Agent, or Firm*—Ritter, Lang & Kaplan LLP

(57) ABSTRACT

A system and method are disclosed for gathering information relating to a loading time experienced by a user of information over a network. A browser agent is sent to a user machine in response to a user request to access a Web page. The browser agent initiates the sending of a user HTTP GET request and the browser agent is operable to log a first time corresponding to the sending of the user HTTP GET request. The browser agent measures a download time interval that is determined according to the difference between the first time and a second time corresponding to the loading of the web page. The browser agent is operative to cause the user machine to send a modified HTTP GET request, wherein the modified HTTP GET request contains a performance parameter indicative of the measured download time interval. Thus, the download time interval experienced by the user is measured and a parameter indicative of the measured download time interval is sent as part of the modified HTTP GET request

30 Claims, 8 Drawing Sheets

| | | |
|---|---|---|
| CookieName | KEYNOTE_BBA_ASI | 300 |
| CookiePrefix | KEYNOTE | 302 |
| Latitude | 7 Character USGS Format | 304 |
| Longitude | 7 Character USGS Format | 306 |
| AgentTypeID | 2 bytes integer, Value = 2 | 308 |
| ProviderID | 2 bytes integer | 310 |
| CustomerID | 4 bytes integer, Value = 0 | 312 |
| PageID | 4 bytes integer, Value = 0 | 314 |

Figure 3

| | | |
|---|---|---|
| DELTA | 4 bytes integer | ~502 |
| Latitude | 7 Character USGS Format | ~504 |
| Longitude | 7 Character USGS Format | ~506 |
| AgentTypeID | 2 bytes integer, Value = 0 | ~508 |
| Provider ID | 2 bytes integer | ~510 |
| CustomerID | 4 bytes integer | ~512 |
| PageID | 4 bytes integer, Value = 0 | ~514 |
| Test Page URL | ACSII | ~516 |

(rows 502–516 grouped as 503)

Figure 5

METHOD AND APPARATUS FOR EVALUATING SERVICE TO A USER OVER THE INTERNET

RELATED APPLICATION

The present application is a continuation of U.S. patent application Ser. No. 08/868,616, filed Jun. 3, 1997, now U.S. Pat. No. 6,006,260.

BACKGROUND OF THE INVENTION

1. Field of the Invention

The present invention relates generally to methods and apparatuses for evaluating service to a user over the Internet, More specifically, the invention relates to methods and apparatuses for determining at a user site the amount of time that certain operations take over the Internet, providing information regarding the timing to a relay server and, in certain embodiments, combining the timing information with information that identifies the user's geographical location.

2. Description of the Related Art

With the explosive growth of the Internet, increased traffic has caused the performance experienced by users making connections over the Internet to vary widely. Many factors can influence the performance of a connection including the user's modem and other equipment, the type of server, the load on the server, and the Internet service provider used. The first step in evaluating connection performance is to obtain reliable information regarding performance characteristics such as the time required to download web pages or other information across a connection It is also important to measure network performance relating to connection less protocols such as UDP.

Currently available methods of measuring download speeds at different sites and collecting that information in a database that facilitates analyzing the information include attempting to measure performance on the server side (that is, on the server that is providing the web pages or other information requested by users) or providing a network of special machines that are programmed to connect to different web sites as clients and evaluate the performance of the connection. The special machines that make up the network can then store or report their connection results.

The main drawback of analyzing connection performance on the server side is that the performance experienced by users is not fully determinable from the measurements made at the server. The server can, of course, determine when packets are sent out and received, and such information measures the responsiveness of the server i.e., how quickly the server sends a response once a request is received. The responsiveness of the server, however, does not fully determine the downloading time that is experienced by the user.

Similarly, a special testing machine can provide accurate information about the downloading time experienced by that machine, but it is not possible to ascertain downloading times experienced by actual users whose hardware or software configuration may differ from the configuration of the testing machine or who request information at a different time. Furthermore, special testing machines do not provide information about actual historical user connections that can be analyzed after a problem has been reported.

What is needed is an apparatus and method for testing network performance that can unobtrusively acquire, collect and organize data relating to network performance from actual users. It would be useful if such a system could measure actual download times experienced by users and use that data to evaluate network performance. It would be useful if such a system were capable of receiving instructions to measure performance and transmit results without violating network security constraints. The system should be capable, for example, of transmitting data from behind a firewall.

SUMMARY OF THE INVENTION

Accordingly, the present invention provides a system that causes a user to measure the download time of a web page experienced by the user accessing the web page. The data is sent from the user to a relay server that preferably combines the performance data with geographical information relating to the user. The data can then be combined with data obtained from other users and stored in a central database for processing.

It should be appreciated that the present invention can be implemented in numerous ways, including as a process, an apparatus, a system, a device, a method, or a computer readable medium. Several inventive embodiments of the present invention are described below.

In one embodiment, a method of gathering information relating to a loading time experienced by a user of information over a network is disclosed. The method includes sending a browser agent to a user machine in response to a user request to access a web page. The browser agent initiates the sending of a user HTTP GET request and the browser agent is operable to log a first time corresponding to the sending of the user HTTP GET request The browser agent measures a download time interval that is determined according to the difference between the first time and a second time corresponding to the loading of the web page. The browser agent is operative to cause the user machine to send a modified HTTP GET request, wherein the modified HTTP GET request contains a performance parameter indicative of the measured download time interval. Thus, the download time interval experienced by the user is measured and a parameter indicative of the measured download time interval is sent as part of the modified HTTP GET request.

In another embodiment, a system for assembling performance data related to the downloading of information from a computer network is disclosed. The system includes a web server configured to send a browser agent to a user in response to a user request. The browser agent is operable to log a first time corresponding to the sending Of a user HTTP GET request and the browser agent is configured to initiate the sending of the user HTTP GET request The browser agent is also configured to measure a download lime interval that is determined according to the difference between the first time and a second time corresponding to the loading of the web page. A relay server is configured to receive from the user a modified HTTP GET request The modified HTTP GET request contains a performance parameter indicative of the measured download time interval. Thus, the download time interval experienced by the user is measured and a parameter indicative of the measured download time interval is received as part of the modified HTTP GET request.

In another embodiment, a system is disclosed for assembling performance data related to the downloading of information from a computer network. The system includes a web server configured to send a browser agent to a user in response to a user request to access a web page. The browser agent is operable to log a first time corresponding to the sending of a user HTTP GET request and the browser agent is configured to initiate the sending of the user HTTP GET request. The browser agent is also configured to measure a download time interval that is determined according to the difference between the first time and a second time corresponding to the loading of the web page. The browser agent is configured to send a modified HTTP GET request that contains a performance parameter indicative of the measured download time interval. Thus, the download time interval experienced by the user is measured and a parameter indicative of the measured download time interval is sent s part of the modified HTTP GET request.

Those and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a table illustrating the contents of a typical cookie sent to a user in step 224 of FIG. 2.

FIG. 5 is a diagram of the fields contained in an HTTP GET header that has been altered to transfer download timing information to a relay server.

DETAILED DESCRIPTION OF THE PREFERRED EMBODIMENTS

Reference will now be made in detail to the preferred embodiments of the invention. An example of the preferred embodiment is illustrated in the accompanying drawings. While the invention will be described in conjunction with that preferred embodiment it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
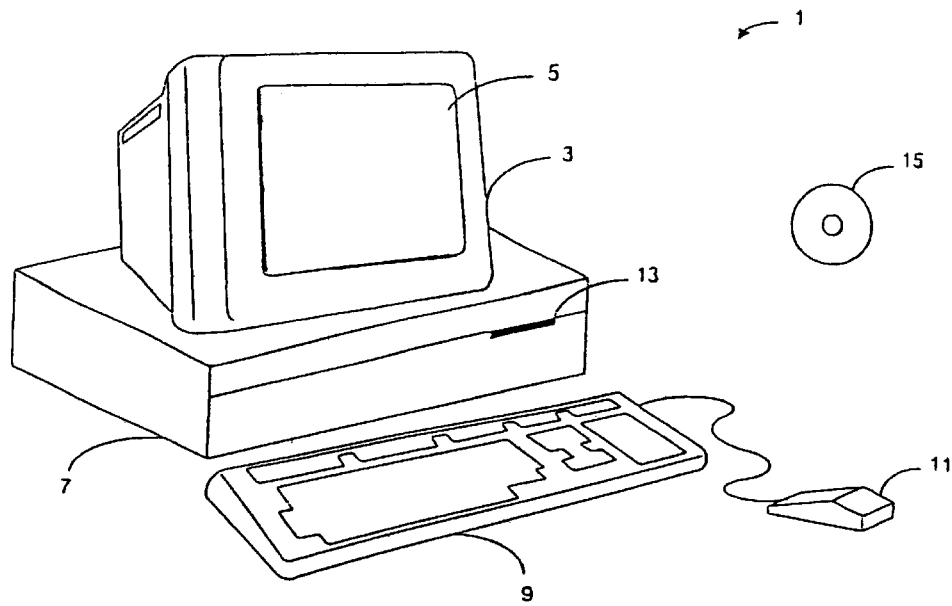
FIG. 1A illustrates an example of a computer system that may be used to execute the software of an embodiment of the present invention.

FIG. 1A illustrates an example of a computer system that may be used to execute the software of an embodiment of the present invention. FIG. 1A shows a computer system 1 which includes a display 3, screen 5, cabinet 7, keyboard 9, and mouse 11 Mouse 11 may have one or more buttons for interacting with a graphical user interface. Cabinet 7 houses a CD-ROM drive 13, system memory and a hard drive (see FIG. 1B) which may be utilized to store and retrieve software programs incorporating computer code that implements the present invention, data for use with the present invention, and the like. Although the CD-ROM 15 is shown as an exemplary computer readable storage medium, other computer readable storage media including floppy disks, tape, flash memory, system memory, and hard drives may be utilized.

Figure 1B:
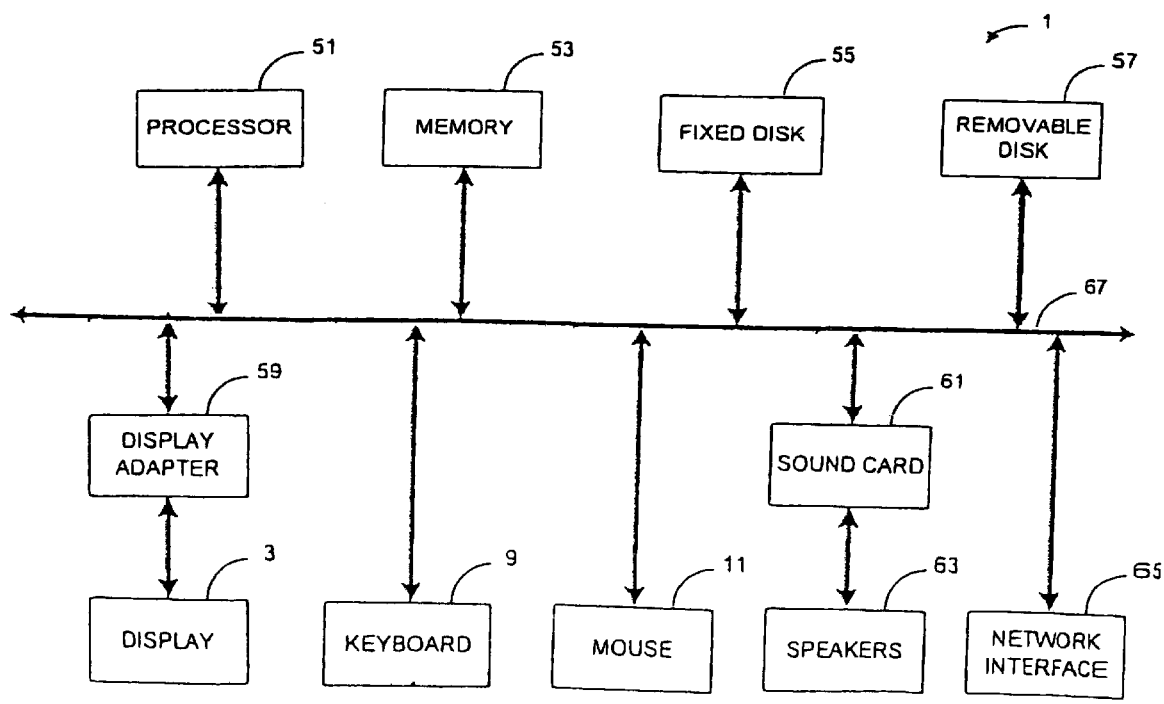
FIG. 1B shows a system block diagram of computer system used to execute the software of an embodiment of the present invention.

FIG. 1B shows a system block diagram of computer system 1 used to Execute the software of an embodiment of the present invention. As in FIG. 1A, computer system 1 includes monitor 3 and keyboard 9, and mouse 11. Computer system 1 further includes subsystems such as a central processor 51, system memory 53, fixed disk 55 (e.g., hard drive), removable disk 57 (e.g., CD-ROM drive), display adapter 59, sound card 61, speakers 63, and network interface 65. Other computer systems suitable for use with the present invention may include additional or fewer subsystems. For example, another computer system could include more than one processor 51 (i.e., a multi-processor system), or a cache memory.

Arrows such as 67 represent the system bus architecture of computer system 1. However, these arrows are illustrative of any interconnection scheme serving to link the subsystems. For example, a local bus could be utilized to connect the central processor to the system memory and the display adapter. Computer system 1 shown in FIG. 1B is but an example of a computer system suitable for us with the present invention. Other configurations of subsystems suitable for use with the present invention will be readily apparent to one of ordinary skill in the art.

Figure 1C:
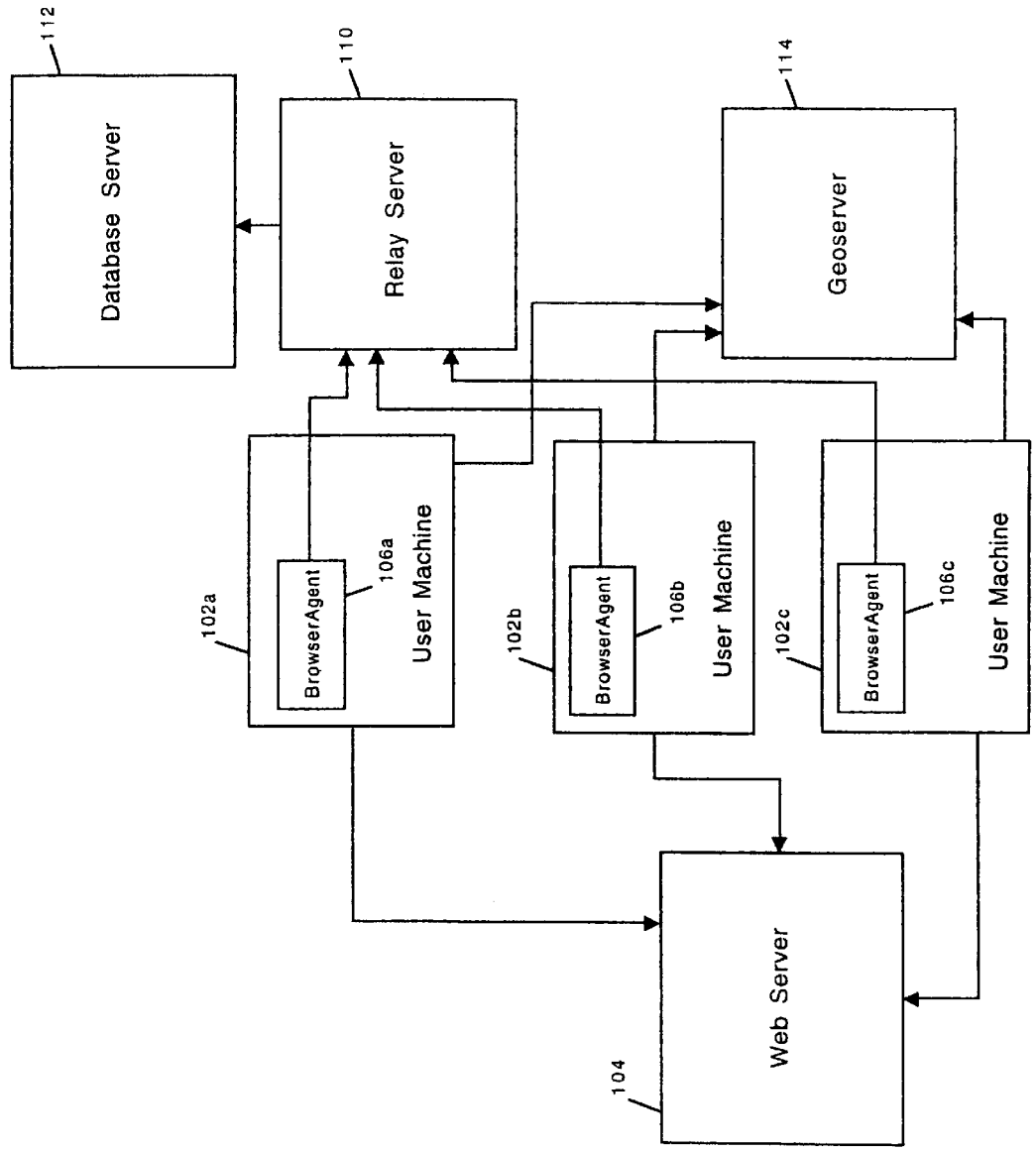
FIG. 1C is a block diagram of a system for measuring download time of a Web page at a group of client sites.

FIG. 1C is a block diagram of a system for measuring the download time of a Web page at a group of client sites. A number of user machines 102a, 102b, and 102c are connected to a Web server 104. In one embodiment, each user machine has a Web browser application running on it that supports JavaScript and HTML frames. Browser agents 106a, 106b, and 106c are shown implemented on each of the user machines. Each browser agent is a collection of JavaScript functions embedded within an HTML page. In various embodiments, browser agents are implemented in JavaScript, Java, or Active. Preferably, browser agents are implemented in an apple that may be received as part of an HTML page for reasons that are described below in other embodiments, browser agents may also be provided as part of an installed browser or a plug-in to a browser that is separately downloaded by a user.

When one of the user machines sends an HTTP GET request to Web server 104, Web server 104 responds to the request by sending an HTML page that contains a browser agent once the HTML page containing a browser agent is downloaded into a Web browser running on a user machine that supports JavaScript and HTML frames, the browser agent is used to measure Web page download Liming as will be described in further detail below.

Each browser agent 106 sends download timing information to a relay server 110 in the form of an HTTP GET request that is adapted to send data in a predefined format, a is described below. Relay server 110 then preferably transfers the data to a database server 112. In different embodiments, database server 112 is located at the site of the Web page provider, at an Internet provider, or at the site of a download timing service center. It should also be noted that database server 112 is combined with relay server 110 in certain embodiments. In addition to providing download timing information, a browser agent can also provide certain geographical, configurational, or identification information about the user machine on which it resides. This information is obtained during a registration process.

The registration process is initiated by a user connecting to a Geoserver 114. Geoserver 114 requests information about the user machine that connects to it and provides the information for storage on the user machine in the form of a cookie. A cookie is a set of data that may be ent in an HTTP GET request from a user to the URL that corresponds to the cookie. Although Geoserver 114 is shown as a separate entity in FIG. 1C, in certain embodiments, Geoserver 114 is combined with relay server 110 and/or database server 112.

A particularly useful feature included in the download liming system shown in FIG. 1C is that all communication between the parts of the system is accomplished in a manner that allows for the fact that different user machines may be operating behind firewalls with varying levels of security constraints. So long as the user machine is able to send HTTP GET requests and download Web pages with embedded Java Script, the user machine can communicate within the system. During the registration process, the user provides information to the relay server and the relay server returns the information to the user in a cookie. Storing geographical and other user information in a cookie file located on the user machine enables the browser agent to transmit that information along with download timing information and other information generated by the browser agent in the form of an HTTP GET request to the relay server. The browser agent itself is downloaded as part of an HTML page in response to an HTTP GET request from the user.

Figure 2:
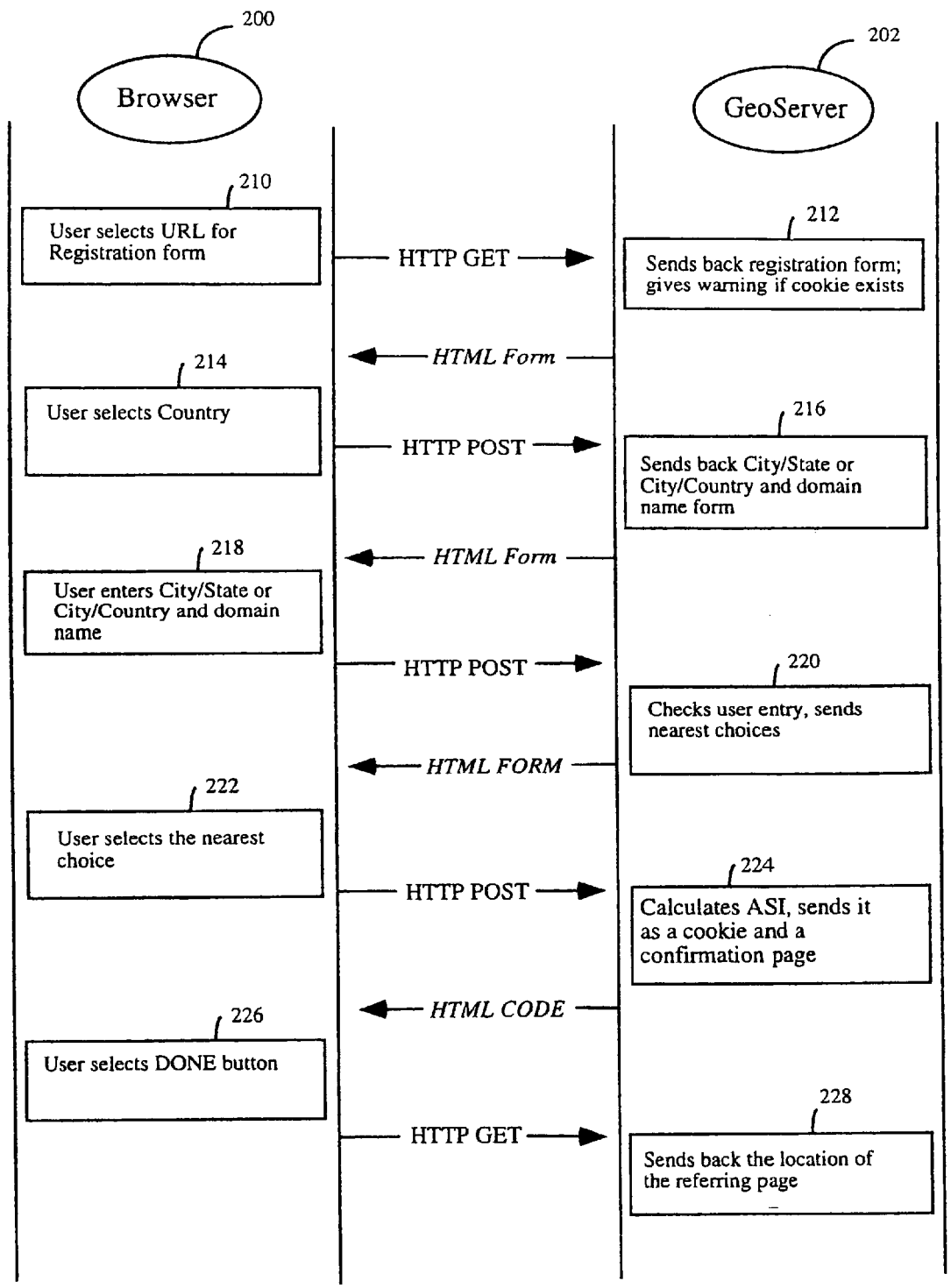
FIG. 2 is a process flow diagram illustrating the registration process that is executed between a browser and a Geoserver.

FIG. 2 is a process flow diagram illustrating the registration process that is executed between a browser 200 and a Geoserver 202. First, in a step 210, a user selects the URL for a registration form. The URL is sent in an HTTP GET request to Geoserver 202. Geoserver 202 replies to the HTTP GET request in a step 212 by sending a registration form as an HTML form. In certain embodiment, Geoserver 202 sends a warning to the user if a cookie exists already in the HTTP GET request that will be overwritten by the registration process. In a step 214, the user selects a country and sends the selection as an HTTP POST. Next, in a step 216, Geoserver 202 sends an HTML form to the user that requests the user's city and state or city and country and domain name. In a step 218, the user enters the city and state or city and country and domain name and sends the information to Geoserver 202 as an HTTP POST.

Geoserver 202 checks the user entry and sends the nearest location choices to the user as an HTML form in a step 220. Location choices are predefined locations that are made available to the user for selection. Large cities may have a number of location choices so that timing may be separately measured in the different locations. The user then selects the nearest choice in a step 222 and sends the choice as an HTTP POST. In sparsely populated areas, a location choice may not be necessary and several small cities may be included together in a single location. In such cases, steps 220 and 222 may be omitted. Geoserver 202 then calculates or looks up the Agent Station Identifier (ASI) for the location specified by the user and sends the ASI as part of a cookie to the user in an HTML CODE and a confirmation page.

The ASI is preferably a latitude and longitude of a location. Selecting the ASI from among choices presented to the user enables the system to collect data for different locations together as desired. By specifying the location in latitude and longitude, it is ensured that the locations are unique. In a step 226, the user indicates that the process is done on the confirmation page and communicates that to Geoserver 202 by sending an HTTP GET request. In some embodiments, Geoserver 202 then sends back the location of the referring page in a step 228.

FIG. 3 is a table illustrating the contents of a typical cookie sent to a user in step 224 of FIG. 2. A cookie is a name-value pair in the form name-value. The cookie has a specified data structure so that the information transferred by the cookie can be recovered. A cookie name 300 identifies the cookie. A cookie prefix 302 visually identifies the cookie to the user. Users generally have the option of setting their browser software to notify them when a cookie is being sent and to require confirmation before a cookie is added to the user's cookie file. Cookie prefix 302 provides a visual label to help the user to decide whether or nut to accept the cookie.

A latitude 304 and a longitude 306 identify the position of the user machine that registered. Latitude and longitude are preferably stored in 7 character USGS formal. An Agent type ED 308 is used to identify the type of agent that is registered and is preferably stored in 2 bytes. In one embodiment Agent type ID 308 specifies whether the agent is a browser based agent or a server based agent. It should be noted that server based agents in certain embodiments do not need to use cookies since they can access the server machine memory. In some embodiments, it is preferred not to store the Agent type ID in the cookie and instead to provide it with other information in the HTTP GET request header, since the user might not know the agent type when he is registering with the Geoserver to obtain the cookie. This method is particularly useful when it is desired to provide a version number as part of the Agent type ID. Since the version of the agent that is sent to the user may differ based on the sender, this information is put in the HTTP GET request by the agent itself, and is not provided by a cookie created upon registration.

A provider ID 310 is defined by a Provider table within the Geoserver application. Provider ID's are issued by the Geoserver as part of the cookie based on a one-to-one mapping between an Internet Service Provider's Domain name and a preassigned integer number. A customer ID 312 identifies the customer. The customer is the Web page provider that is having the performance of its Web page tested. A Page ID 314 identifies the owner within an organization of the specific page that is being tested and is defined by the customer.

In alternative embodiments, the customer ID and the page ID are provided in the HTTP GET request instead of in the cookie, since they may not be known on registration, but can be passed to the user with the browser agent apple. The provider ID may also be provided in the HTTP GET request, as is described below.

A sample cookie treated according to the format described above is shown below:

KEYNOTE_BBA_ASI-KEYNOTE_292423N_1242421E_2_1234_0_0

The cookie name, KEYNOTE_BBA_ASI identifies the cookie so that the customer can recognize it when prompted by the browser whether to accept the cookie. The cookie prefix shown is KEYNOTE. The latitude and longitude are 292423N and 1242421E. The Agent Type ID is 2. The provider ID is 1234 and the customer 1D and page ID are both 0. Using this cookie, the browser agent can compactly send all necessary y user information to the relay server.

So far, a system has been described for providing registration information to a Geoserver that converts geographical information to latitude and longitude, combines the geographical information with other identifying information and returns to the user machine a cookie that can function to provide the information as part of an HTTP GET request. The following description shows how timing information is obtained and sent as part of the HTTP GET request.

Figure 4A:
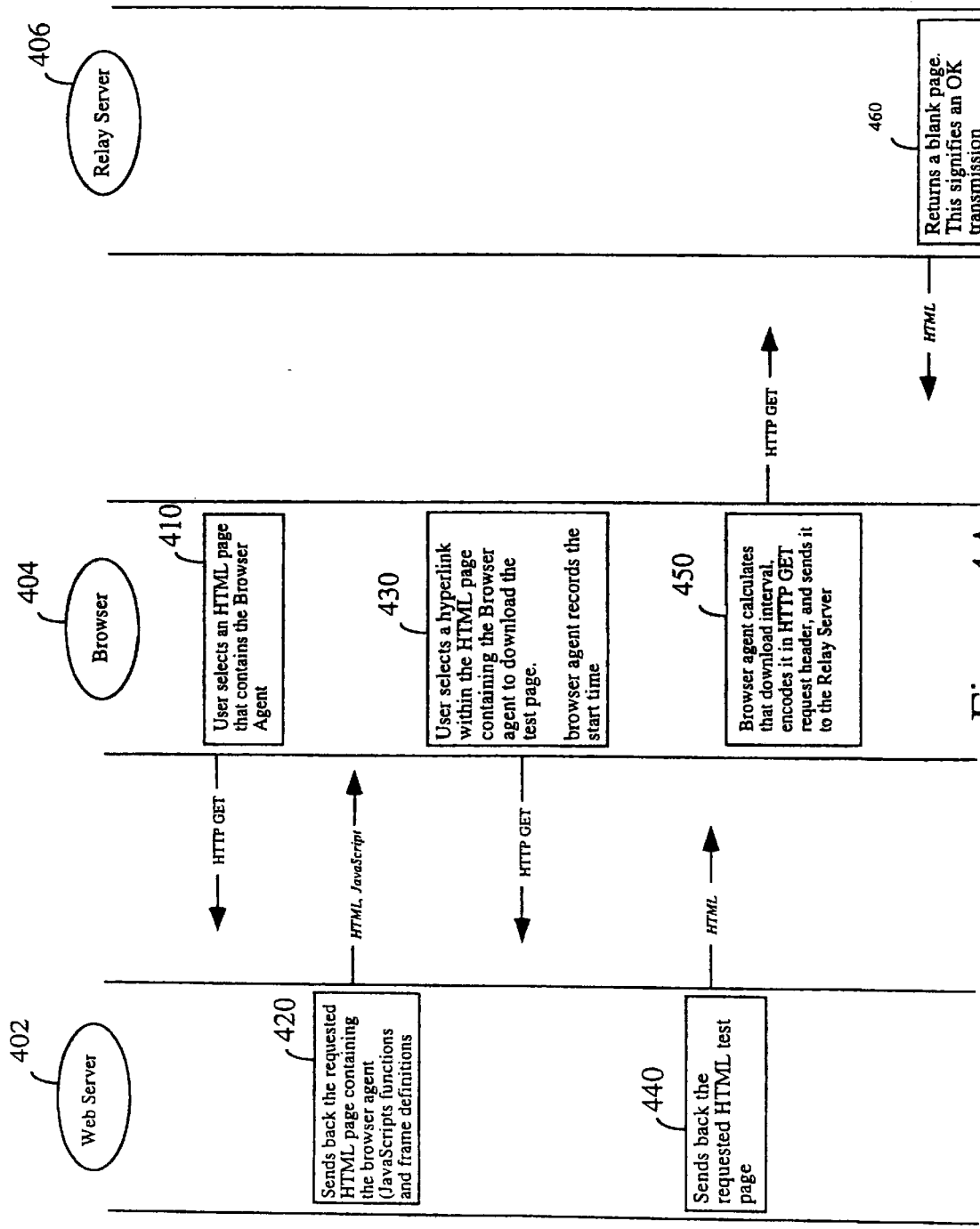
FIG. 4A is a process flow diagram illustrating a process running on a Web server, a browser, and a relay server for timing the downloading of a Web page.

FIG. 4A is a process flow diagram illustrating a process running on a Web server 402, a browser 404, and a relay server 406 for timing the downloading of a Web page. In a step 410, the user running browser 404 selects an HTML page that contains the browser agent. This results in the sending of an HTTP GET request to Web server 402 Web server 402 then sends back the requested HTML page containing the browser agent in a step 420. It should be noted here that in different cases, the user may or may not realize that he is requesting a browser agent. For example, if a Web page provider desires to obtain performance information about a Web page that it provides, the provider could provide the browser agent and frame set in response to a user request for the Web page. The browser agent could then request the page and, depending on the frame set sent along with the browser agent, a visual indication to the user that the browser agent has requested and is monitoring download performance may be provided. In other embodiments, the user knowingly selects the browser agent. The browser agent may provide to the user a list of pages that may be downloaded that arc supported by the browser agent or the browser agent may automatically select a page. If a list is provided, the user selects a page from among a list of choices provided by the browser agent. Thus, in different embodiments, performance monitoring is done when a user selects a Web page that the provider wishes to be monitored or performance monitoring is done after the user purposely requests a browser agent.

The browser agent is made up of JavaScript functions and an HTML Frame set definition. An HTML Frame set is an HTML page containing definitions of Frames, or logical definitions of a single Web page. Each Frame is defined by its size, position, and display content Frames may be invisible, that is they are not displayed on the screen, or may be very small, consisting of only a small point or box, or may be large enough to contain text or links to other pages. The processes running on the browser agent are further described in FIG. 6. In a step 430, a hyperlink within the HTML page containing the browser agent is selected to download the test page and an HTTP GET request is sent as a result. As noted above, the test page may also be downloaded automatically by the browser agent, without the user selecting a hyperlink, In one embodiment, the browser agent records the time of the sending of the HTTP GET request as the start time. Upon receiving the HTTP GET request, Web server 402 sends back the requested Web page in a step 440. In a step 450, the browser agent calculates the download interval, encodes it in an HTTP GET request header, and sends the HTTP GET request to relay server 406. In one embodiment, the end of the download interval is marked using the on load finction. In other embodiments, tie browser agent calculates other performance parameters in addition to or in place of the download interval. For example, the time required for the server to send the first byte or to end transmission may be measured. It should also be noted that in some embodiments, the measurement and reporting functions are placed in a for loop so that the web browser repeatedly accesses a Web page, making repeated measurements and sending multiple reports to the relay server.

In some embodiments, rather than sending the actual download time, the browser agent makes a qualitative assessment of the performance and sends the assessment. The qualitative assessment may be made relative to an absolute scale (eg. less than 2 seconds is performance level 1 or green, greater than 2 seconds but less than 4 seconds is performance level 2 or yellow, and greater than 4 seconds is performance level 3 or red) or a sliding scale based on average observed performance (e.g. above or below average). In certain embodiments, the browser also displays the qualitative assessment to the user. Once it receives the performance report, relay server 406 returns a blank HTML page to browser 404 in a step 460 signifying that the HTTP GET request was received, As noted above, in this example, the user first selects an HTML page that contains the browser agent in a visible agent frame and then makes a page selection from this frame after receiving the page containing that agent. The resulting selection is displayed in the display frame. In another embodiment, the user makes only one selection The user selects the desired HTML page that he wishes to download. The browser agent is sent in response as part of a hidden agent frame that is included in an initial HTML page. The JavaScript that implements the browser agent then automatically sends an HTTP GET request to retrieve the desired HTML page in the display frame.

By controlling the sending of the HTTP GET request for the desired HTML, page, the browser agent is able to record the time the request was sent and monitor the receiving of the page to determine the download time. In such an embodiment it is possible to record the timing of the Web page download in a manner that is transparent to the user. The user simply requests a desired page. Instead of receiving the page directly, the user first gets a page containing the browser agent. The browser then automatically sends the request for the desired page and notes the download time. The browser agent is thus a powerful tool for providing download timing information to a Web page provider. Each user who downloads data from the server provides download timing information and no additional action or choice is required from the user to provide the information since the browser agent is provided first in response to the HTTP GET request. The browser agent requests the desired page, times the download, and sends the download timing information to the relay server as part of an HTTP GET request without further intervention by the user.

Figure 4B:
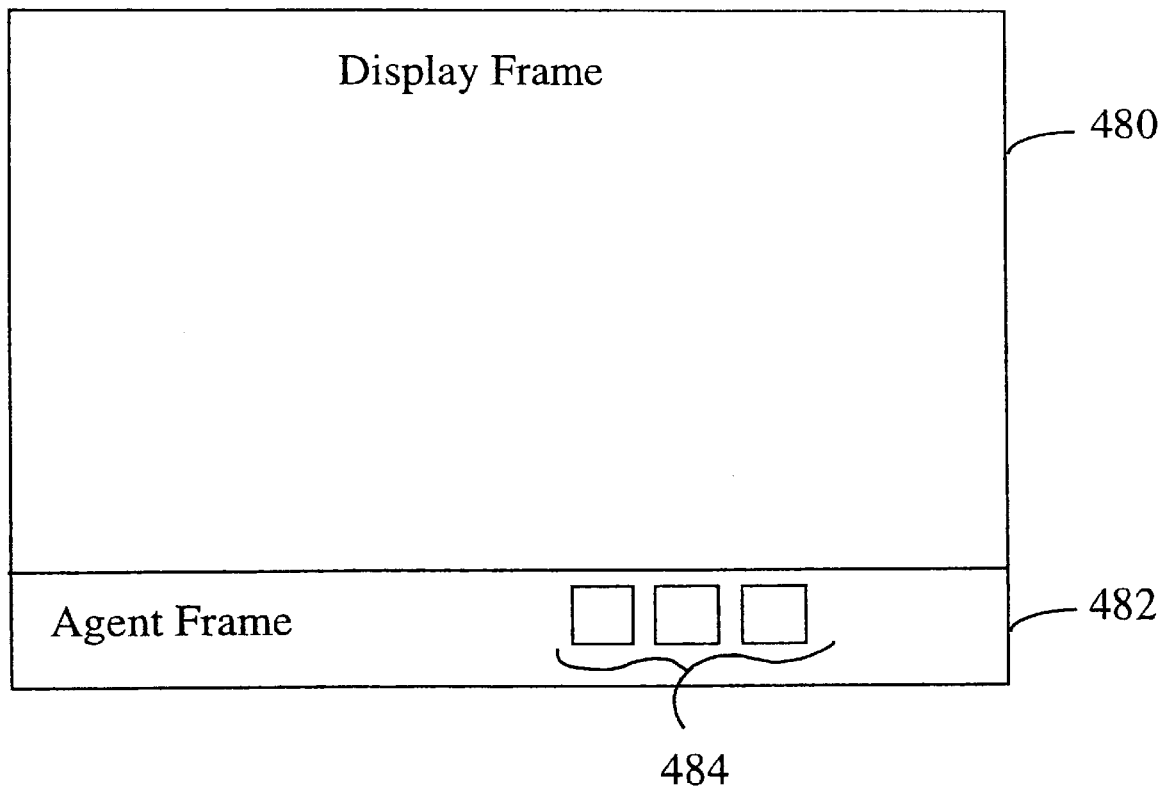
FIG. 4B is an illustration of a frame set used in an embodiment where a visible agent frame containing links to test pages that may be downloaded.

FIG. 4B is an illustration of a Frame set used in an embodiment where a visible agent frame containing links to test pages that may be downloaded. A Display frame 480 is initially blank. Display frame 480 eventually contains the test page that is downloaded. An agent frame 482 is also shown as a visible frame, Agent frame 482 condors a set of links to test pages that may be downloaded by the browser agent and displayed in display frame 480. In this embodiment, test pages are not downloaded automatically, but instead are selected by the user from the links in the visible agent frame. In embodiment where the agent provides the test page automatically, the agent frame may be an invisible frame or may be only a very small frame that functions only as a visual indicator that the frame is there, if that is desired.

FIG. 5 is a diagram of the fields contained in an HTTP GET request header that has been altered to transfer download timing information to a relay server. The download time interval measured by the browser agent is encoded as a DELTA field 502. In one embodiment, the DELTA field is an integer representing a number of milliseconds. The delta field is sent as a variable DELTA in the HTTP GET request header. Next, a group,of fields are defined that make up a page station identifier (PSI) 503. These include a latitude field 504 and a longitude field 506 in 7 character USGS format; an agent type ID field 508 that is preferably a 2 byte integer; a service provider ID field 510 that is preferably a 2 byte integer; a customer ID field 512 that is preferably a 4 byte integer, and a page ID field 514 that is preferably a 4 byte integer. Customer ID field 510 identifies the owner of the page that is being measured and page ID field 514 identifies the specific page that is measured. Together, the page station identifier fields describe the unique combination of the HTML page and the server on which the page resides. The test page URL is also included in the HTTP GET request header in some embodiments as a test page URL ASCII variable 516. The test page URL identifies the Web page that is downloaded, but not necessarily the server. The customer ID and page ID identity the server and the page.

A sample HTTP GET request header sent by the browser agent to the relay server is shown below:
GET/DELTA=661&PSI=
292423N%5F1242421E%5F0%5F1234%5F1234%
5F1234&URL=http://ny.us.keynote.com:2989/
BBADEV/test.html HTTP/1.0

The DELTA shown is equal to 661. The page station identifier fields are shown delimited by %5 (which is the underscore character in HTML) within the variable PSI. The test page URL is shown as the value of the URL variable.

At this point, it may be useful to discuss the data that is preferably sent to the relay server as part of the cookie file and the data that is preferably sent to the relay server as part of the PSI or as another field in the HTTP GET request header. The cookie file preferably contains information that identifies the user and the user's Internet service provider. This is advantageous because storing this information once in the cookie alleviates the need for the browser agent to ask the user for the information. On the other hand, information that is either determined by the browser agent (such as the DELTA), or that can be included in the browser agent when it is sent to the user (such as the customer ID and the page ID), is included as a field in the HTTP GET request header. Thus, the user does not have to input information that is not known to the browser agent but that is in the cookie and the browser agent provides the information that it has available for the fields in the HTTP GET request header without the need for user input.

In the data structures shown, certain fields from the cookie such as latitude field 504, longitude field 506, and service provider ID) field 510 ire shown in the PSI. It should be understood that these fields are included for the purpose of providing flexibility for implementations that do not take advantage of a cookie or for implementations that might for some reason require that the browser agent obtain this information each lime that the browser agent is sent. Likewise, certain fields provided by the browser agent in tie PSI fields of the HTTP GET header such as Agent type ID 308, customer ID 312, and Page ID 314 are shown in the cookie even though such information would generally not be available during the registration process Such fields are shown in the cookie again to allow for flexibility of implementation. In certain embodiments, the extra fields also may be used for other purposes, It should be noted that conventionally, the cookie is only sent to the owner of the cookie. The owner of the cookie is the party that stored the cookie. In the embodiment described above, therefore, the owner of the cookie is the Geoserver. In one preferred embodiment where the cookie is used, the Geoserver is implemented on the same physical machine as the Relay server so that the cookie is sent to the Relay server with the HTTP GET request. In other embodiments, the Geoserver is used to relay the HTTP GET request to the Relay server. The Geoserver gets the cookie and transfers the cookie information to the Relay server, This can be done a number or ways, including using the fields in the HTTP GET header. Alternatively, it is possible for the browser agent to prompt the user for the cookie information and include it along with the rest of the fields in the HTTP GET header.

Using the data formats described above, it is possible for the browser agent to assemble all of the necessary information for communication to the relay server. The cookie stored on the user machine stores information about the user that is provided by the Geoserver. Information about the page station that is providing the Web page and which is being evaluated for download performance is transmitted with the browser agent. Thus, page station information is provided via the agent and the user need not provide any information. Page station information along with measured download timing information is provided to the relay server via fields in the HTTP GET request header. User geographic location information and service provider information is provided by the cookie. Information about the user is provided once in the registration process and stored in the cookie so that it is provided along with the HTTP GET request sent from the browser to the relay server.

In certain embodiments, inflation about the user need not be provided and the browser agent is sent from the page station to users whether or not they have registered In such cases, users with blank cookies or no cookies are kept track of by the relay server in a separate geographical category from users whose geographic category and other information is known. Information about such users is useful when evaluating the generic, system wide performance of a server regardless of the location of the user.

Figure 6:
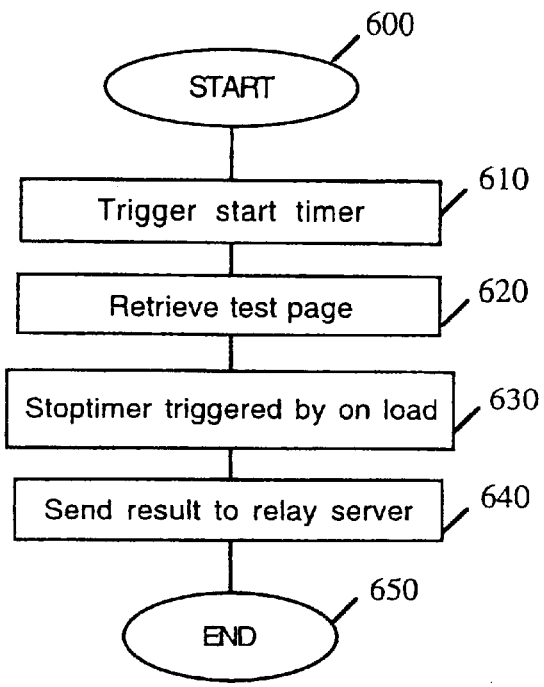
FIG. 6 is a process flow diagram illustrating the process implemented on tile browser agent.

FIG. 6 is a process flow diagram illustrating the process implemented on the browser agent for measuring and reporting download time. The process starts at 600. In a step 610, the agent triggers a start timer. In a step 620, the test page is retrieved. Next, in a step 630, a stop timer is triggered by the on load function when the test page is loaded It should be noted that in other embodiments other events may be used to trigger the stop timer. In a step 640, the result of the test is sent to a relay server. The process ends at 650.

Figure 7:
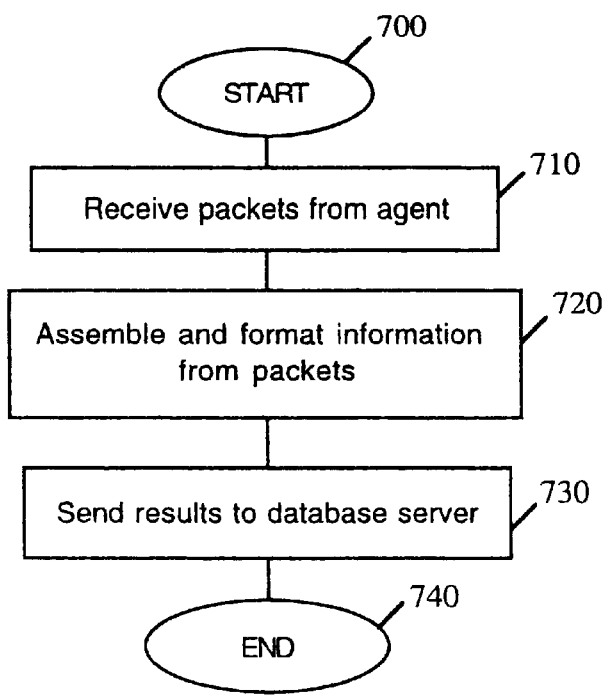
FIG. 7 is a process flow diagram illustrating the process implemented on the relay server.

FIG. 7 is a process flow diagram illustrating the process implemented on the relay server. The process starts at 700. In a step 710, the relay server receives packets from agents. In a step 720, data from packets is assembled and formatted. In a step 730, the database server is contacted and results are sent. The process ends at 740. This, the relay server receives actual historical performance data from browser agents. If network problems occur, the data from the relay server or the database server can be used to analyze network performance at different times.

Thus, a method and apparatus for evaluating service to a user over the Internet has been disclosed. The method disclosed may also be applied to any other network computing environment, including public or private interned or intranets. Download time, or any other performance parameter that is desired may be measured using an agent that monitors information as it is transmitted between parties. In one embodiment, the network is the Internet and the information is transmitted in the form of Web pages. Results are preferably sent to a relay server for formatting before being stored in a database server. In some embodiments, results are sent directly to a database server.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of gathering information relating to a loading time experienced by a user of information over a network comprising:

sending a browser agent to a user machine in response to a user request to access a Web page, wherein the browser agent is operable to log a first time corresponding to the sending of a user HTTP GET request, wherein the browser agent initiates the sending of the user HTTP GET request, and wherein the browser agent measures a download time interval, the download time interval being determined according to the difference between the first time and a second time corresponding to the loading of the Web page; and wherein the browser agent is operative to cause the user machine to send a modified HTTP GET request, wherein the modified HTTP GET request contains a performance parameter indicative of the measured download time interval;

whereby the download time interval experienced by the user is measured and a parameter indicative of the measured download time interval is sent as part of the modified HTTP GET request.

2. A method as recited in claim 1 wherein the browser agent is further operative to cause the user to send a user information cookie as part of the HTTP GET request, wherein the user information cookie includes information related to the user.

3. A method as recited in claim 2 wherein the information related to the user includes a geographical coordinate.

4. A method as recited in claim 2 wherein the geographical coordinate is predetermined according to a city indicated by the user.

5. A method as recited in claim 1 further including receiving a plurality of user modified HTML requests from a plurality of users and recording a plurality of performance parameters, the plurality of performance parameters being indicative of a plurality of measured download time intervals determined by each of the plurality of users.

6. A method as recited in claim 5 further including generating a map that indicates the performance experienced by users in different regions.

7. A method as recited in claim 1 wherein the modified HTTP GET request is generated by the browser agent.

8. A method as recited in claim 1 wherein the performance parameter is the difference between the first time and the second time.

9. A method as recited in claim 1 wherein the performance parameter is a qualitative evaluation of performance based on the difference between the first time and the second time.

10. A method as recited in claim 1 wherein the second time corresponds to the completion of the loading of the Web page.

11. A method as recited in claim 10 wherein download time interval is equal to the difference between the first time and the second time.

12. A method as recited in claim 1 wherein the network is the Internet.

13. A method as recited in claim 12 wherein the information downloaded is a Web page.

14. A system for assembling performance data related to the downloading of information from a computer network comprising:

a Web server configured to send an browser agent to a user in response to a user request, wherein the browser agent is operable to log a first time corresponding to the sending of a user HTTP GET request, wherein the browser agent is configured to initiate the sending of the user HTTP GET request, and wherein the browser agent is configured to measure a download time interval, the download time interval being determined according to the difference between the first time and a second time corresponding to the loading of the Web page; and a relay server configured to receive from the user a modified HTTP GET request, wherein the modified HTTP GET request contains a performance parameter indicative of the measured download time interval;

whereby the download time interval experienced by the user is measured and a parameter indicative of the measured download time interval is received as part of the modified HTTP GET request.

15. A system as recited in claim 14 wherein the relay server is configured to receive from the user as part of the HTTP GET request a user information cookie, wherein the user information cookie includes information related to the user.

16. A system as recited in claim 15 wherein the information related to the user includes a geographical coordinate.

17. A system as recited in claim 15 wherein the geographical coordinate is predetermined according to a city indicated by the user.

18. A system as recited in claim 15 wherein the network in the Internet.

19. A system as recited in claim 14 wherein the relay server is operable to receive a plurality of user modified HTML requests from a plurality of users and record a plurality of performance parameters, the plurality of performance parameters being indicative of a plurality of measured download time intervals determined by each of the plurality of users.

20. A system as recited in claim 14 further including means for generating a map that indicates the performance experienced by users in different regions.

21. A system as recited in claim 14 wherein the performance parameter is the difference between the first time and the second time.

22. A system as recited in claim 14 wherein the performance parameter is a qualitative evaluation of performance based on the difference between the first time and the second time.

23. A system as recited in claim 14 wherein the second time corresponds to the completion of the loading of the Web page.

24. A system as recited in claim 14 wherein the download time interval is equal to the difference between the first time and the second time.

25. A system as recited in claim 14 wherein the Web server and the relay server are implemented on a single physical machine.

26. A system as recited in claim 14 wherein the Web server and the relay server are implemented on different physical machines.

27. A system as recited in claim 14 wherein the network is the Internet.

28. A system for assembling performance data related to the downloading of information from a computer network comprising:

a Web server configured to send a browser agent to a user in response to a user request to access a Web page, wherein the browser agent is operable to log a first time corresponding to the sending of a user HTTP GET request, wherein the browser agent is configured to initiate the sending of the user HTTP GET request, and wherein the browser agent is configured to measure a download time interval, the download time interval being determined according to the difference between the first time and a second time corresponding to the loading of the Web page; and wherein the browser agent is configured to send a modified HTTP GET request, the modified HTTP GET request containing a performance parameter indicative of the measured download time interval;

whereby the download time interval experienced by the user is measured and a parameter indicative of the measured download time interval is sent as part of the modified HTTP GET request.

29. A system as recited in claim 28 wherein the download time interval is included in the header of the modified HTTP GET request.

30. A system as recited in claim 28 wherein the network is the Internet.

* * * * *